US008633920B2

(12) United States Patent
Yamashita et al.

(10) Patent No.: US 8,633,920 B2

(45) Date of Patent: Jan. 21, 2014

(54) DISPLAY DEVICE AND DISPLAY DRIVE METHOD

(75) Inventors: Junichi Yamashita, Tokyo (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 983 days.

(21) Appl. No.: 12/461,133

(22) Filed: Aug. 3, 2009

(65) Prior Publication Data

US 2010/0045637 A1 Feb. 25, 2010

(30) Foreign Application Priority Data

Aug. 19, 2008 (JP) ................................ 2008-210507

(51) Int. Cl.

*G06F 3/038* (2013.01)
*G09G 5/00* (2006.01)
*G09G 3/30* (2006.01)

(52) U.S. Cl.

USPC ............................................ 345/204; 345/77

(58) Field of Classification Search

USPC ........................................................ 345/204

See application file for complete search history.

(56) References Cited

U.S. PATENT DOCUMENTS

| | | | |
|---|---|---|---|
| 7,102,202 B2 | 9/2006 | Kobayashi et al. | |
| 2005/0206590 A1 | 9/2005 | Sasaki et al. | |
| 2008/0030436 A1* | 2/2008 | Iida et al. | 345/77 |

FOREIGN PATENT DOCUMENTS

| | | |
|---|---|---|
| JP | 2003-271095 | 9/2003 |
| JP | 2005-258326 A | 9/2005 |
| JP | 2006-330223 A | 12/2006 |
| JP | 2007-133282 | 5/2007 |
| JP | 2007-255856 | 10/2007 |
| JP | 2008-033193 A | 2/2008 |

OTHER PUBLICATIONS

Japanese Office Action issued May 6, 2010 for Corresponding Japanese Application No. 2008-210507.

* cited by examiner

*Primary Examiner* — Charles V Hicks

(74) *Attorney, Agent, or Firm* — Rader, Fishman & Grauer PLLC

(57) ABSTRACT

A display device includes: a pixel array including pixel circuits arranged in a matrix state, in which each pixel circuit has a light emitting element, a drive transistor, and a storage capacitor storing a threshold voltage of the drive transistor and an inputted signal value; a threshold correction operation means for performing a threshold correction operation plural times, which allows the storage capacitor to store the threshold voltage of the drive transistor by supplying a drive voltage to the drive transistor in a state in which a gate potential of the drive transistor is in a reference value before giving the signal value to the storage capacitor; and a cut-off control means for cutting off the drive transistor by supplying an intermediate voltage which is lower than the drive voltage to the drive transistor in a after-correction period which is the period after the period of the threshold correction operation.

15 Claims, 7 Drawing Sheets

DISPLAY DEVICE AND DISPLAY DRIVE METHOD

BACKGROUND OF THE INVENTION

1. Field of the Invention

The invention relates to a display device including a pixel array in which pixel circuits are arranged in a matrix state and a display drive method thereof, and relates to, for example, a display device using an organic electroluminescence element (organic EL element) as a light emitting element.

2. Description of the Related Art

An image display device in which an organic EL element is used in a pixel is developed, for example as shown in JP-2003-255856 and JP-2003-271095 (Patent Documents 2 and 3). Since the organic EL element is a self-luminous element, it has advantages such that visibility of images is higher than, for example, a liquid crystal display, a backlight is not necessary and response speed is high. The luminance level (tone) of each light emitting element can be controlled by a value of current flowing therein (so-called current-control type).

The organic EL display has a passive matrix type and an active matrix type as a drive method in the same manner as the liquid crystal display. The former has problems such that it is difficult to realize a large-sized as well as high-definition display though it has a simple configuration, therefore, the active-matrix type display device is vigorously developed at present. The display device of this type controls electric current flowing in the light emitting element in each pixel circuit by an active element (commonly, a thin film transistor: TFT) provided-inside the pixel circuit.

SUMMARY OF THE INVENTION

As the pixel circuit configuration using the organic EL element, improvement of display quality as well as realization of high luminance, high definition and a high frame rate (high frequency) by eliminating luminance unevenness in each pixel and the like are strongly requested.

From the above viewpoint, various configurations are considered. For example, pixel circuit configurations and operations are variously proposed, in which luminance unevenness in each pixel can be eliminated by cancelling variation of a threshold voltage or mobility of a drive transistor in each pixel as in JP-2007-133282 (Patent Document 1).

It is desirable to realize a pixel circuit operation suitable for realizing the higher definition and higher frequency as the display device using the organic EL element.

According to an embodiment of the invention, there is provided a display device including a pixel array having pixel circuits arranged in a matrix state, in which each pixel circuit has at least a light emitting element, a drive transistor applying electric current to the light emitting element in accordance with a signal value given between a gate and a source by a drive voltage applied between the drain and the source, and a storage capacitor connected between the gate and the source of the drive transistor and storing a threshold voltage of the drive transistor and the inputted signal value. The display device also includes a threshold correction operation means for performing a threshold correction operation plural times, which allows the storage capacitor to store the threshold voltage of the drive transistor by supplying a drive voltage to the drive transistor in a state in which a gate potential of the drive transistor is in a reference value before giving the signal value to the storage capacitor and a cut-off control means for cutting off the drive transistor by supplying an intermediate voltage which is lower than the drive voltage to the drive transistor in an after-correction period which is the period after the period of the threshold correction operation.

The display device also includes a signal selector supplying potentials as the signal value and the reference value to respective signal lines arranged in columns on the pixel array, a write scanner introducing the potential of the write control lines arranged in rows on the pixel array, and a drive control scanner applying the drive voltage to the drive transistors in the pixel circuits by using respective power control lines arranged in rows on the pixel array. The threshold correction operation means is realized by an operation of making the gate potential of the drive transistor be the reference value given from the signal line by the write scanner and an operation of supplying the drive voltage to the drive transistor by the drive control scanner, and the cut-off control means is realized by an operation of cutting off the drive transistor by supplying the intermediate voltage which is lower than the drive voltage to the drive transistor by the drive control scanner.

The pixel circuit further includes a sampling transistor in addition to the light emitting element, the drive transistor and the storage capacitor, in which the sampling transistor is connected to the write control line at a gate thereof, connected to the signal line at one of source/drain, and connected to the gate of the drive transistor at the other of source/drain, and in which the drive transistor is connected to the light emitting element at one of source/drain and connected to the power control line at the other of source/drain.

The operation as the threshold correction operation means is performed by allowing the sampling transistor to be conductive by the write scanner as well as supplying the drive voltage to the drive transistor from the power control line by the drive control scanner in a period in which the potential given to the signal line from the signal selector is the reference value, and the operation as the cut-off control means is performed by allowing the sampling transistor to be non-conductive by the write scanner as well as supplying the intermediate voltage to the drive transistor from the power control line by the drive control scanner in the after-correction period.

According to another embodiment of the invention, there is provided a drive method of a display device including a pixel array having pixel circuits arranged in a matrix state, in which each pixel circuit has at least a light emitting element, a drive transistor applying electric current to the light emitting element in accordance with a signal value given between a gate and a source by a drive voltage applied between the drain and the source, and a storage capacitor connected between the gate and the source of the drive transistor and storing a threshold voltage of the drive transistor and the inputted signal value. In the method, a threshold correction operation is performed plural times, which allows the storage capacitor to store the threshold voltage of the drive transistor by supplying a drive voltage to the drive transistor in a state in which a gate potential of the drive transistor is in a reference value before giving the signal value to the storage capacitor, and the drive transistor is cut off by supplying an intermediate voltage which is lower than the drive voltage to the drive transistor in an after-correction period which is the period after the period of the threshold correction operation.

As the pixel circuit operation in the organic EL display device is performed in a higher frequency, the threshold correction operation of the drive transistor is performed in a time division manner in some cases. At this time, the drive transistor is cut off in the after-correction period, thereby suppressing the increase of the gate potential and the source potential to perform more accurate threshold correction.

Here, as the method of cutting off the drive transistor, the intermediate voltage is supplied to the drive transistor and a coupling is formed through a parasitic capacitor between the gate and drain of the drive transistor.

According to another embodiment of the invention, when performing threshold correction in the time division manner, the drive transistor is cut off in the after-correction period, thereby performing threshold correction more suitably, and as a result, image quality of the display device can be improved. Additionally, as the method of cutting off the drive transistor, the intermediate voltage is supplied to the drive transistor and the coupling is formed through the parasitic capacitor between the gate and drain of the drive transistor, thereby performing cut-off control at high speed, which leads to the operation suitable also in a point of the operation in the higher frequency.

DESCRIPTION OF THE PREFERRED EMBODIMENTS

Hereinafter, as a display device according to an embodiment of the invention, an example of a display device using the organic EL element will be explained in the following order.

Figure 1:
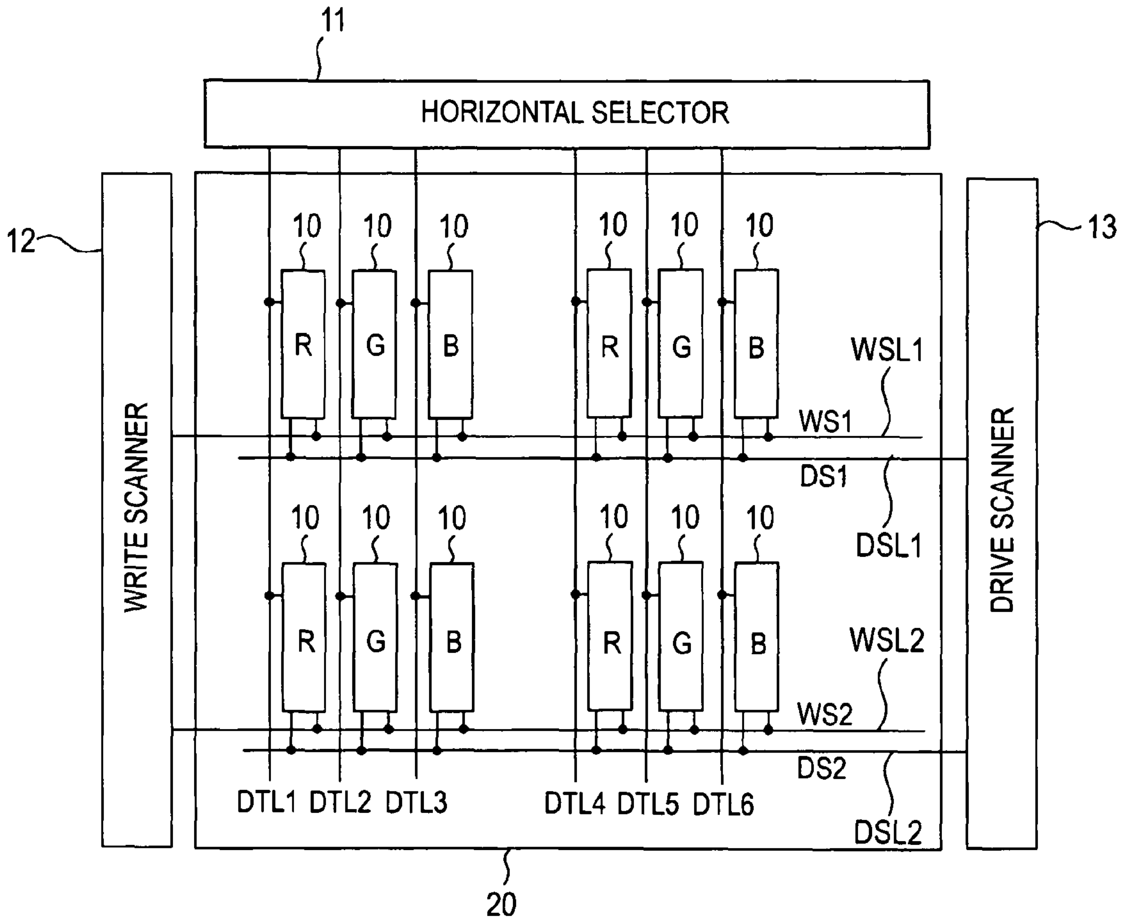
FIG. 1 is an explanatory diagram of a configuration of a display device according to an embodiment of the invention.

1. Configuration of a display device according to an embodiment
2. Pixel circuit operation in a process leading to an embodiment of the invention
3. Pixel circuit operation as an embodiment of the invention 1. Configuration of a Display Device According to an Embodiment FIG. 1 shows the whole configuration of a display device according to an embodiment. The display device includes pixel circuits 10 having a correction function with respect to variation of a threshold voltage and mobility of a drive transistor as described later.

As shown in FIG. 1, the display device of the embodiment includes a pixel array unit 20 in which pixel circuits 10 are arranged in a column direction as well as in a row direction in a matrix state. "R", "G" and "B" are given to the pixel circuits 10, which indicate that the circuits are light emitting pixels of respective colors of R (red), G (Green) and B (Blue).

In order to drive the respective pixel circuits 10 in the pixel array unit 20, a horizontal scanner 11, a write scanner 12 and a drive scanner (drive control scanner) 13 are included.

Additionally, signal lines DTL1, DTL2 . . . which are selected by the horizontal selector 11 and supply video signals corresponding to luminance information as input signals with respect to the pixel circuits 10 are arranged in the column direction in the pixel array unit 20. The signal lines DTL1, DTL2 . . . are arranged by the number of columns of the pixel circuits 10 arranged in the matrix state in the pixel array unit 20.

Furthermore, write control lines WSL1, WSL2 . . . and power control lines DSL1, DLS2 . . . are arranged in the row direction in the pixel array unit 20. These write control lines WSL and the power control lines DSL are arranged by the number of rows of the pixel circuits 10 arranged in the matrix state in the pixel array unit 20.

The write control lines WSL (WSL1, WSL2 . . . ) are driven by the write scanner 12. The write scanner 12 supplies scanning pulses WS (WS1, WS2 . . . ) sequentially to the respective write control lines WSL1, WSL2 arranged in rows at predetermined timings to perform line-sequential scanning of the pixel circuits 10 by the row.

The power control lines DSL (DSL1, DLS2 . . . ) are driven by the drive scanner 13. The drive scanner 13 supplies power pulses DS (DS1, DS2 . . . ) as a power supply voltage switched to three values of a drive voltage (V1), an intermediate voltage (V2) and an initial voltage (Vini) to the respective power control lines DSL1, DSL2 . . . arranged in rows so as to correspond to the line-sequential scanning by the write scanner 12.

The horizontal selector 11 supplies a signal potential (Vsig) and a reference potential (Vofs) as input signals with respect to the pixel circuits 10 to the signal lines DTL1, DTL2 . . . arranged in the column direction so as to correspond to the line-sequential scanning by the write scanner 12.

Figure 2:
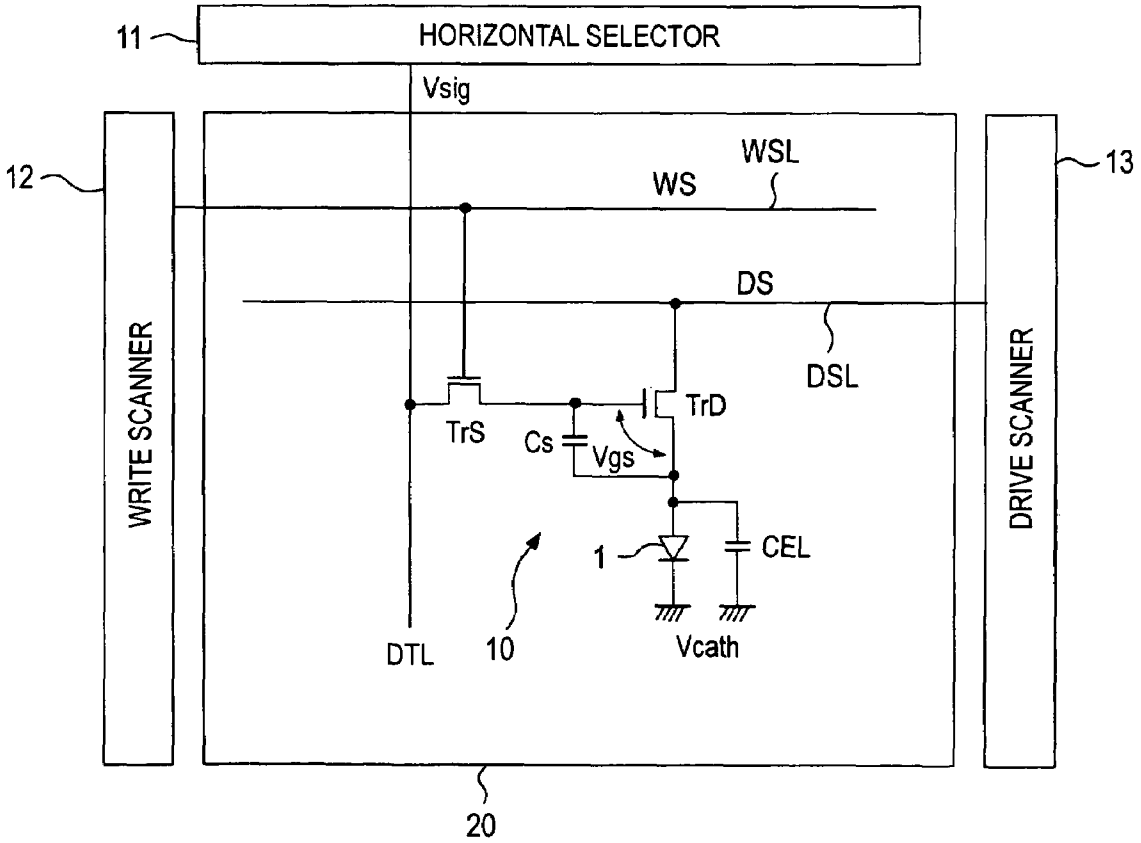
FIG. 2 is an explanatory diagram of a pixel circuit configuration according to the embodiment.

FIG. 2 shows a configuration of the pixel circuit 10. The pixel circuits 10 are arranged in a matrix state as shown in the pixel circuits 10 in the configuration of FIG. 1. In FIG. 2, only one pixel circuit 10 is shown for simplification, which is arranged at a portion where the signal line DTL, the write control line WSL and the power control line DSL cross one another.

The pixel circuit 10 includes an organic EL element 1 as a light emitting element, a storage capacitor Cs and two thin-film transistors (TFT) as a sampling transistor TrS and a drive transistor TrD. The sampling transistor Trs and the drive transistor TrD are n-channel TFTs.

One terminal of the storage capacitor Cs is connected to a source of the drive transistor TrD, and the other terminal is connected to a gate of also the drive transistor TrD.

The light emitting element of the pixel circuit 10 is, for example, an organic EL element 1 of a diode configuration, having an anode and a cathode. The anode of the organic EL element 1 is connected to the source of the drive transistor TrD and the cathode is connected to a given ground wiring (cathode potential Vcath). A capacitor CEL is a parasitic capacitor of the organic EL element 1.

One terminal of drain/source of the sampling transistor TrS is connected to the signal line DTL and the other terminal is connected to the gate of the drive transistor TrD. A gate of the sampling transistor TrS is connected to the write control line WSL.

A drain of the drive transistor TrD is connected to the power control line DSL.

Light emitting drive of the organic EL element 1 is performed in the following manner.

The sampling transistor TrS becomes conductive by the scanning pulse WS given from the write scanner 12 by the write control line WSL at the timing when the signal potential Vsig is applied to the signal line DTL. Accordingly, the input signal Vsig from the signal line DTL is written in the storage capacitor Cs. The drive transistor TrD is supplied with a current from the power control line DSL to which the drive potential V1 is given by the drive scanner 13 and supplies the organic EL element 1 with current corresponding to the signal potential stored in the storage capacitor Cs to thereby allowing the organic EL element 1 to emit light.

In the pixel circuit 10, an operation (hereinafter, referred to as a Vth cancel operation) for correcting effects of variation of a threshold voltage Vth of the drive transistor TrD before current drive of the organic EL element 1 is performed. Further, a mobility correction operation for cancelling effects of variation of mobility of the drive transistor TrD is performed simultaneously with the writing of the input signal Vsig from the signal line DTL to the storage capacitor Cs.

2. Pixel Circuit Operation in a Process Leading to an Embodiment of the Invention Here, a circuit operation studied in the process leading to an embodiment of the invention in the above pixel circuit 10 will be explained. Particularly, an operation of performing dividing correction as the Vth cancel will be explained with reference to FIG. 3.

Figure 3:
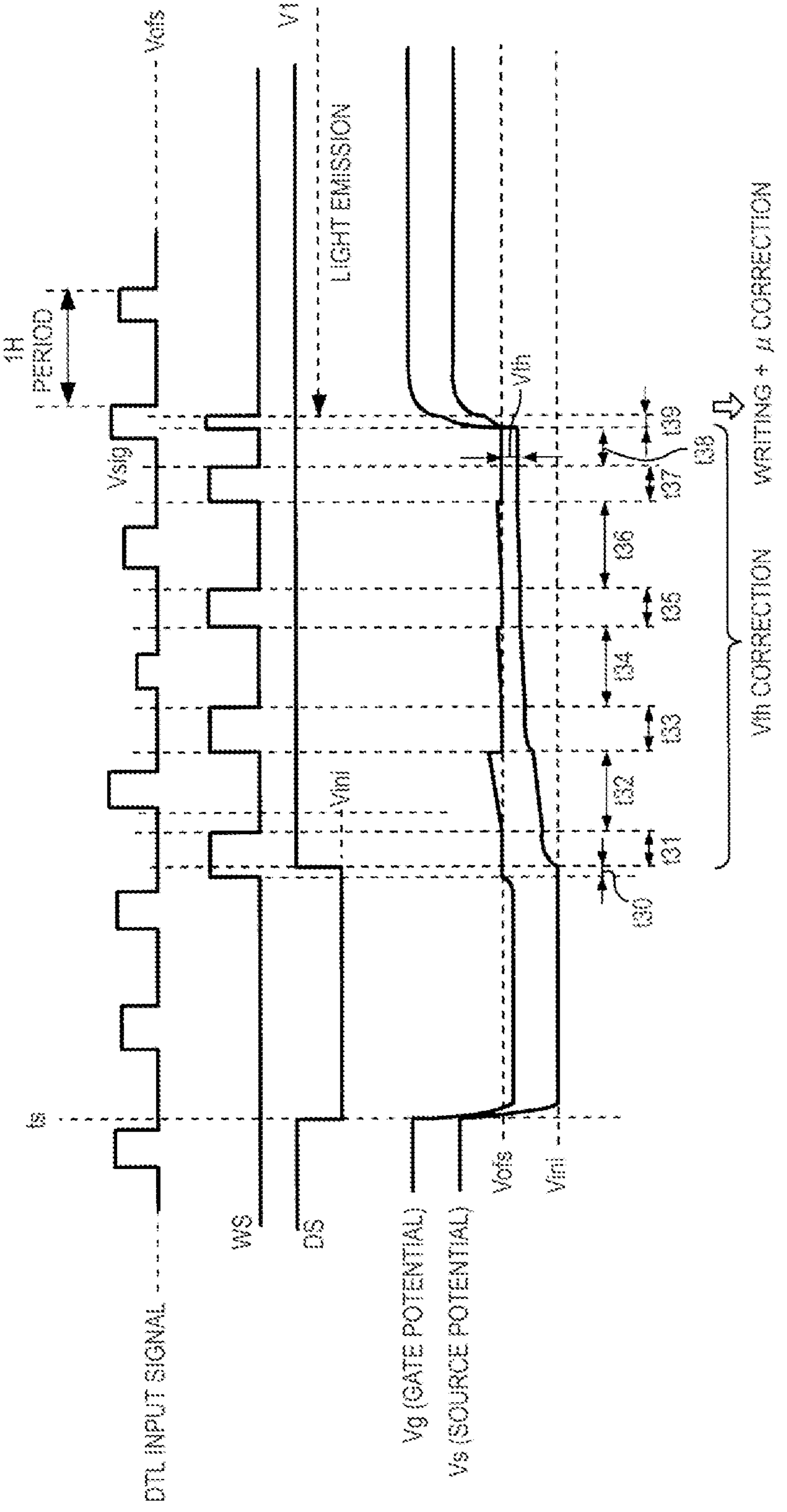
FIG. 3 is an explanatory chart of a pixel circuit operation before reaching the embodiment.

In FIG. 3, the potentials (the signal potential Vsig and the reference potential Vofs) given to the signal line DTL during a 1H period by the horizontal selector 11 are shown as the DTL input signal.

As the scanning pulse WS, a pulse to be applied to the write control line WSL by the write scanner 12 is shown. The sampling transistor TrS is controlled to be conductive/non-conductive by the scanning pulse WS.

As the power pulse DS, voltages to be applied to the power control line DSL by the drive scanner 13 are shown. As the voltages, the drive scanner 13 supplies the drive voltage V1 and the initial voltage Vini so as to be switched at predetermined timings.

The variations of a gate potential Vg, a source potential Vs of the drive transistor TrD are also shown.

A point “ts” in a timing chart of FIG. 3 indicates a start timing of one cycle in which the organic EL element 1 as the light emitting element is driven for emitting light, for example, one frame period of image display.

First, the drive scanner 13 supplies the initial potential Vini as the power pulse DS at the point “ts”. Accordingly, the source potential Vs of the drive transistor TrD is reduced at the initial potential Vini and the organic EL element 1 is in a non-light emitting state. The gate potential Vg of the drive transistor TrD in a floating state is also reduced.

After that, a preparation for the Vth cancel operation is made during a period “t30”. That is, when the signal line DTL is in the reference potential Vofs, the scanning pulse WS is made to be H-level to allow the sampling transistor TrS to be conductive. Accordingly, the gate potential Vg of the drive transistor TrD is fixed at the potential Vofs. The source potential Vini maintains the initial potential Vini.

According to the above, a voltage Vgs between the gate and the source of the drive transistor TrD is made to be higher than the threshold voltage Vth to thereby prepare the Vth cancel operation.

Next, the Vth cancel operation is started. In this case, the threshold correction is performed in a time division manner in periods t31, t33, t35 and t37.

First, in the period “t31”, the power pulse DS is made to be in the drive potential V1 while the gate potential Vg of the drive transistor TrD is fixed in the reference potential Vofs, thereby increasing the source potential Vs.

At this time, however, the write scanner 12 turns on the scanning pulse WS intermittently in periods when the signal line DTL is in the reference voltage Vofs for preventing the source potential Vs from exceeding the threshold of the organic EL element 1 as well as for allowing the sampling transistor TrS to be non-conductive in periods when the DTL input signal is in the signal potential Vsig. Accordingly, the Vth cancel operation is performed in periods t31, t33, t35 and t37 in the divided manner.

The Vth cancel operation is completed when the voltage Vgs between the gate and the source of the drive transistor TrD becomes equal to the threshold voltage Vth (period t27).

In a period t32 (after-correction period) after the period t31 when the Vth correction operation is performed, an after-correction period t34 after the period t33, and as an after-correction period t36 after the period t35, the sampling transistor TrS is in an off state by the scanning pulse WS. This is for preventing signal values from being applied to the gate of the drive transistor TrD during period in which the DTL input signal is in signal value voltages (signal values for pixels of other lines). However, in the after-correction periods t32, t34 and t36, the drive potential V1 from the power control line DSL is continuously supplied to the drain of the drive transistor TrD.

Since the drive transistor TrD is not completely cut off, electric current is not completely stopped, and consequently, a phenomenon is observed in which the source potential Vs is increased and the gate potential Vg is increased accordingly as shown in the drawing. The increased gate potential Vg is returned to the reference potential Vofs as the DTL input signal when the sampling transistor TrS is turned on by the scanning pulse WS.

As described above, after the Vth cancel operation is performed plural times in the divided manner, and after a period t38, the scanning pulse WS is turned on in a timing (period t39) when the signal line DTL becomes in the signal potential Vsig with respect to the pixel circuit, thereby writing the signal potential Vsig in the storage capacitor Cs. The period t39 is also a mobility correction period of the drive transistor TrD.

In the period t39, the source potential Vs is increased in accordance with the mobility of the drive transistor TrD. That is, when the mobility of the transistor TrD is high, the increased amount of the source potential Vs is high, and when the mobility is low, the increased amount of the source potential Vs is low. As a result, this will be the operation of adjusting the voltage Vgs between the gate and the source of the drive transistor TrD in the light emitting period in accordance with the mobility.

After that, when the source potential Vs is in the potential exceeding the threshold of the organic EL element 1, the organic EL element 1 emits light.

In short, the drive transistor TrD allows drive current to flow in accordance with the potential stored in the storage capacitor Cs to thereby cause the organic EL element 1 to emit light. At this time, the source potential Vs of the drive transistor TrD is held in a given operation point.

The drive potential V1 is applied to the drain of the drive transistor TrD from the power control line DSL so that the drive transistor TrD is constantly operated in a saturated region, and therefore, the drive transistor TrD functions as a constant current source and an electric current Ids flowing in the organic El element 1 will be represented by the following formula 1 in accordance with the voltage Vgs between the gate and the source of the drive transistor TrD.

$$I_{ds} = \frac{1}{2}\mu\frac{W}{L}C_{ox}(V_{gs} - V_{th})^2$$ [Formula 1]

Ids represents the electric current flowing between the drain and the source of the transistor operating in the saturation region, μ represents the mobility, W represents a channel width, L represents a channel length, Cox represents a gate capacity, Vth represents a threshold voltage of the drive transistor TrD and Vgs represents the voltage between the gate and the source of the drive transistor TrD.

Figure 4:
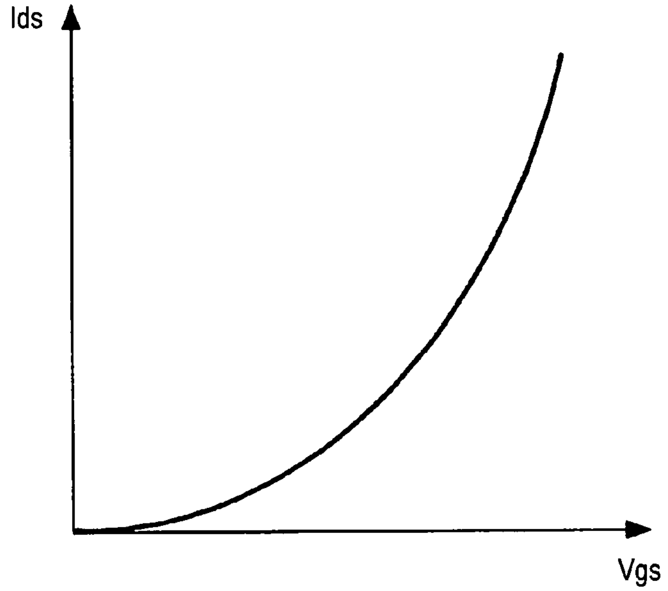
FIG. 4 is an explanatory graph of Ids-Vgs characteristics of a drive transistor.

As can be seen from the Formula 1, the electric current Ids depends on a square value of the voltage Vgs between the gate and the source of the drive transistor TrD, and therefore, the relation between the electric current Ids and the voltage Vgs between the gate and the source will be as shown in FIG. 4.

The drain current Ids of the drive transistor TrD is controlled by the voltage Vgs between the gate and the source in the saturation region. Since the voltage Vgs between the gate and the source of the drive transistor TrD (=Vsig+Vth) is fixed by the action of the storage capacitor Cs, the drive transistor TrD operates as the constant current source allowing a fixed current to flow in the organic EL element 1.

Accordingly, an anode potential (source potential Vs) of the organic EL element 1 is increased to a voltage at which electric current flows in the organic EL element 1 to allow the organic EL element to emit light. That is, light emission at luminance in accordance with the signal voltage Vsig in this frame is started.

Accordingly, in the pixel circuit 10, the operation for light emission of the organic EL element 1 including the Vth cancel operation and the mobility correction is performed in one frame period.

According to the Vth cancel operation, electric current corresponding to the signal potential Vsig can be given to the organic EL element 1 regardless of variation of the threshold voltage Vth of the drive transistor TrD in each pixel circuit 10 or change of the threshold voltage Vth due to change over time. That is, it is possible to maintain high image quality without generating luminance variation and the like on the screen by cancelling the variation of the threshold voltage Vth due to manufacture or by the change over time.

Since the drain current changes also by the mobility of the drive transistor TrD, image quality is reduced by variation of the mobility of the drive transistor TrD at each pixel circuit 10, but the source potential Vs can be obtained according to the degree of mobility of the drive transistor TrD by the mobility correction, so that the source potential Vs is adjusted to obtain the voltage Vgs between the gate and the source which absorbs variation of the mobility of the drive transistor TrD in each pixel circuit 10, therefore, reduction of image quality due to the variation of mobility is also prevented.

The Vth cancel operation is performed plural times in the time division manner because there is a request for the high frequency in the display device. As the frame rate becomes higher, operation time of the pixel circuit becomes relatively shorter, and therefore, it is difficult to secure the continuous Vth cancel period. Accordingly, the period necessary for the Vth cancel is secured by performing the Vth cancel operation in the time division manner to thereby allow the voltage between the gate and the source of the drive transistor TrD to be converged to the threshold voltage Vth.

However, when the Vth cancel operation in the time division manner as shown in FIG. 3 is performed, the source potential Vs and the gate potential Vg are increased at the after-correction periods t32, t34 and t36 as described above. This raises fears of malfunctions in the Vth cancel operation.

After the source potential Vs and the gate potential Vg are increased in the after-correction periods t32, t34 and t36 as described above, the gate potential Vg is returned to the reference potential Vofs by re-starting the Vth cancel operation, however, the source potential Vs maintains increased potential. At this time, the voltage between the gate and the source may possibly be decreased to be lower than the threshold voltage Vth in some cases. In such case, the accurate Vth cancel operation is not realized.

Accordingly, in order to address the circumstances, it becomes preferable that the drive transistor TrD is forcibly cut off in the after-correction periods t32, t34 and t36.

Figure 5:
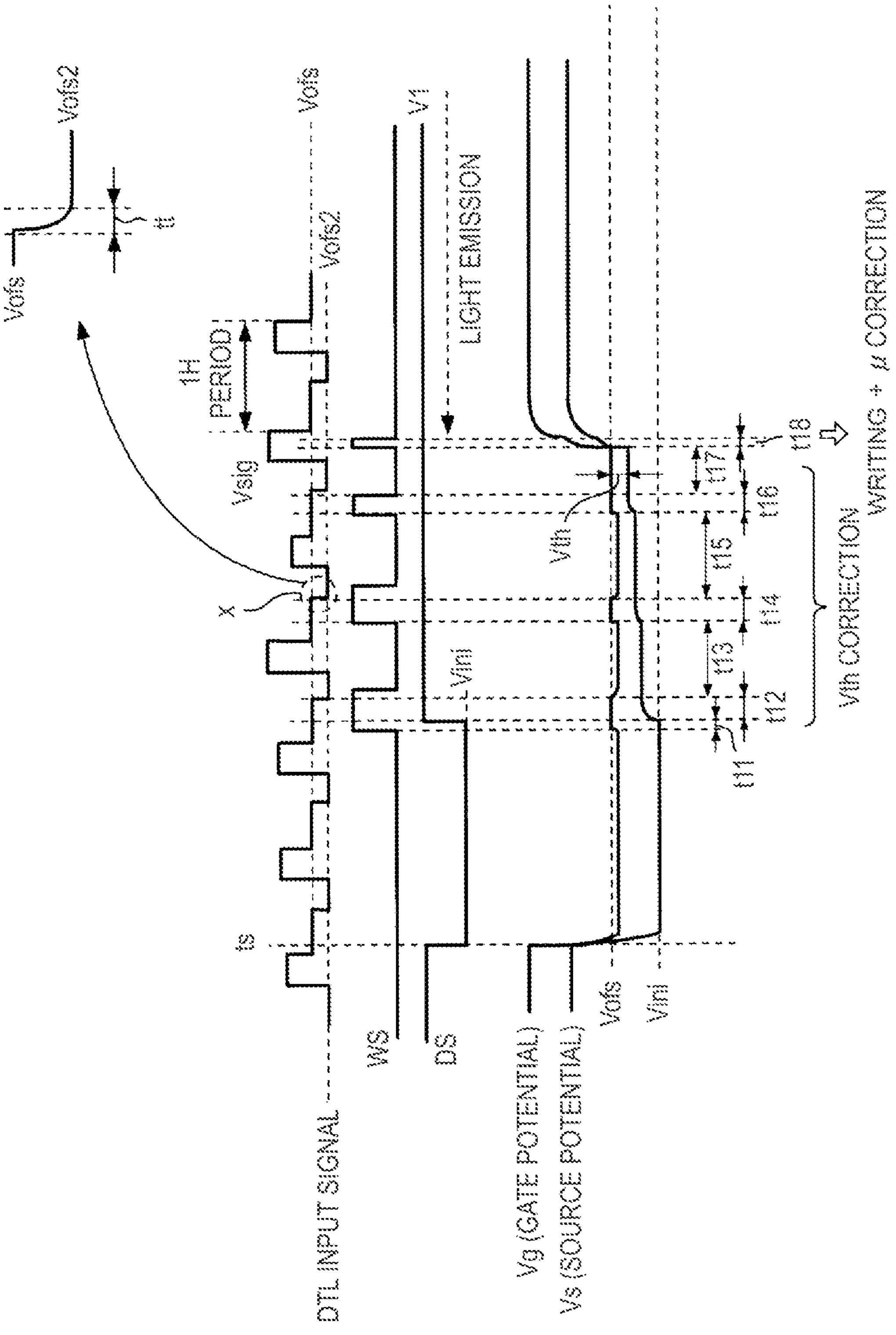
FIG. 5 is an explanatory chart of another pixel circuit operation before reaching the embodiment.

Accordingly, operations shown in FIG. 5 are considered.

FIG. 5 shows respective waveforms in the same manner as FIG. 3.

After preparation of the Vth cancel operation is made in a period t11, the Vth cancel operation is performed in periods t12, t14 and t16 in the time division manner. After the Vth cancel operation is performed plural times in the divided manner, and after a period t17, the signal potential Vsig is written in the storage capacitor Cs and the mobility correction of is performed in a period t18.

Then, in after-correction periods t13 and t15, the drive transistor TrD is completely cut off in this case, thereby preventing the increase of the source potential Vs and the gate potential Vg as shown in the drawing.

In order to cut off the drive transistor TrD, a low potential Vofs2 for the cutoff is supplied as the DTL input signal generated by the horizontal selector 11, in addition to the signal value (Vsig) and the reference potential Vofs.

For example, the start point of the after-correction period t13 just after the period t12 corresponds to the timing in which the DTL input signal is in the low potential Vofs2, and the sampling transistor TrS maintains an on state by the scanning pulse WS at this time, thereby giving the low potential Vofs2 to the gate of the drive transistor TrD. The same applies to the start point of the after-correction period t15 just after the period t14.

As described above, the low potential Vofs2 is applied to the gate of the drive transistor TrD to allow the drive transistor TrD to be in a cut-off operation point, preventing the increase of the source potential Vs and the gate potential Vg in the after-correction periods t13 and t15 to thereby realize the accurate Vth cancel operation.

However, to cut off the drive transistor TrD in the above method, there are the following problems.

The change from the reference potential Vofs to the low potential Vofs2 as voltage change to be given to the gate of the drive transistor TrD relatively takes time because the signal voltage has high load capacitance with respect to the DTL input signal, and the voltage is applied through the sampling transistor TrS. For example, the change of the signal voltage at a portion "x" surrounded by a broken line in the DTL input signal is shown in enlargement in FIG. 5. As a period "tt" during which the reference potential Vofs is changed to the low potential Vofs2, several μ seconds are necessary. Then, respective timings of the circuit operation in FIG. 5 have to be designed in consideration of the period "tt".

It goes without saying that this is not really a problem if the higher frame rate is not particularly requested, however, when the higher frequency in the circuit operation is requested, the necessity of consideration for the period "tt" may be a problem on the design of the circuit operation.

3. Pixel Circuit Operation as an Embodiment of the Invention

As an embodiment of the invention, a method for cutting off the drive transistor TrD at higher speed is proposed.

Figure 6:
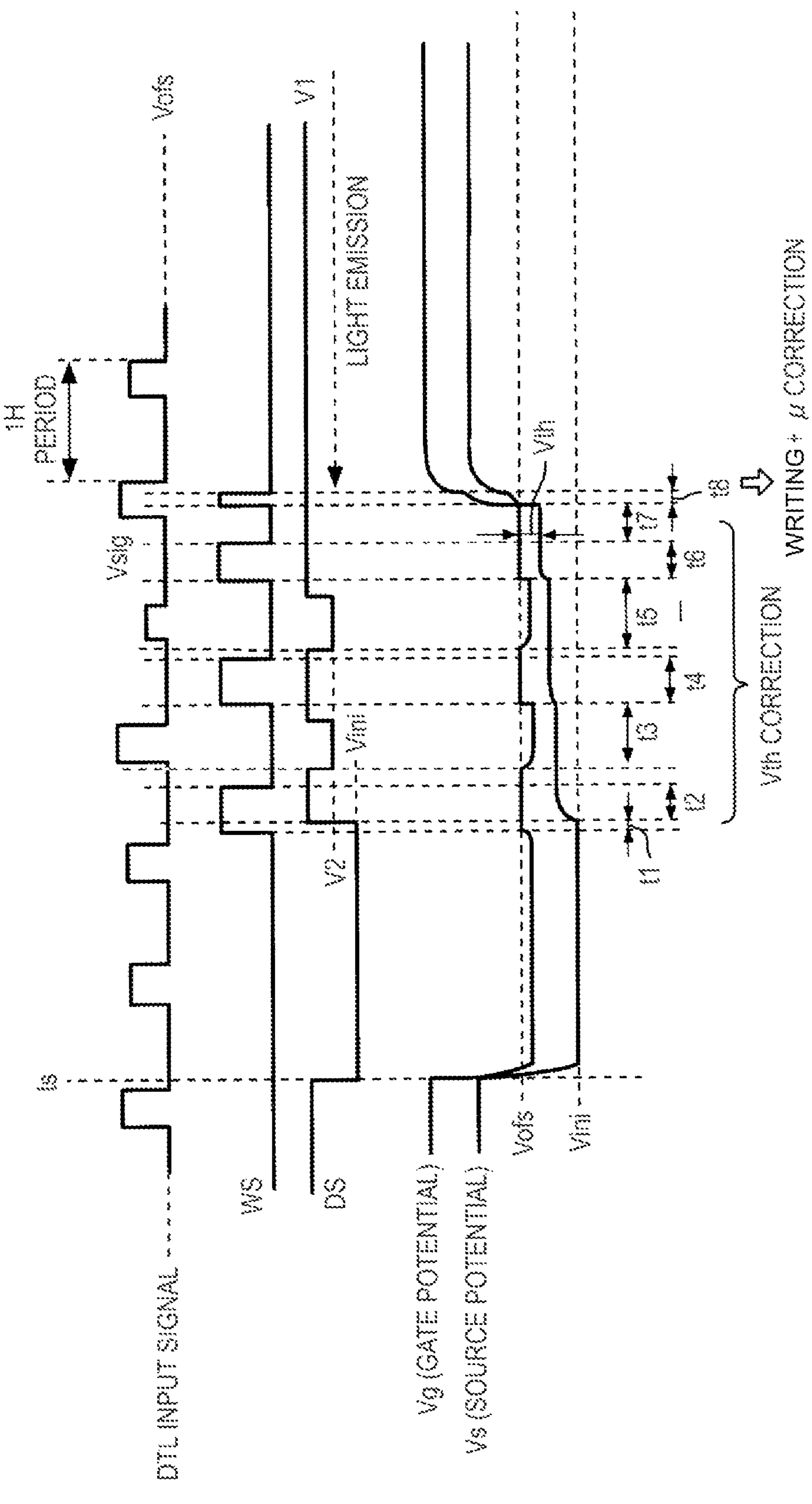
FIG. 6 is an explanatory chart of a circuit operation according to the embodiment.

A circuit operation according to the embodiment is shown in FIG. 6.

Also in FIG. 6, potentials (the signal potential Vsig and the reference potential Vofs) given to the signal line DTL by the horizontal selector 11 are shown as the DTL input signal in the same manner as in FIG. 3 and FIG. 5.

As the scanning pulse WS, a pulse to be applied to the write control line WSL by the write scanner 12 is shown.

As the power pulse DS, voltages to be applied to the power control line DSL by the drive scanner 13 are shown. In the case of FIG. 6, as voltages to be applied to the power control line DSL, the intermediate voltage V2 is generated by the drive scanner 13 in addition to the drive potential V1 and the initial potential Vini, which are switched at predetermined timings.

The changes of the gate potential Vg and the source potential Vs of the drive transistor TrD are also shown.

A cycle of the light-emitting drive operation of the organic EL element 1 is started as a point "ts" in a timing chart of FIG. 6.

First, the drive scanner 13 allows the power pulse DS given to the power control line DSL to be the initial potential Vini at the point "ts". According to this, the source potential Vs of the drive transistor TrD is reduced at the initial potential Vini and the organic EL element 1 is in the non-light emitting state. The gate potential Vg of the drive transistor TrD is also reduced.

After that, preparation for the Vth cancel operation is made during a period "t1". That is, when the signal line DTL is in the reference voltage Vofs, the scanning pulse WS is made to be H-level by the drive scanner 13 to allow the sampling transistor TrS to be conductive. Accordingly, the gate potential Vg of the drive transistor TrD is fixed to the voltage Vofs. The source potential Vs maintains the initial potential Vini. As the preparation for the Vth cancel, the voltage Vgs between the gate and the source of the drive transistor TrD is made to be higher than the threshold voltage Vth in this manner.

Next, the Vth cancel operation is started. In this case, the threshold correction is performed in the time division manner in periods t2, t3 and t6.

First, the power pulse DS is made to be the drive potential V1 by the drive scanner 13 while fixing the gate voltage Vg of the drive transistor TrD to be the reference potential Vofs, thereby increasing the source potential Vs.

The Vth cancel operation is executed in the periods t4, t6 in the same manner.

The Vth cancel operation is completed when the voltage Vgs between the gate and the source of the drive transistor TrD becomes equal to the threshold voltage Vth (period t6).

As described above, after the Vth cancel operation is performed plural times in the divided manner, and after a period t7, the scanning pulse WS is turned on in a timing (period t8) when the signal line DTL becomes in the signal potential Vsig with respect to the pixel circuit, thereby the signal potential Vsig being written in the storage capacitor Cs. The period t8 is also a mobility correction period of the drive transistor TrD.

In the period t8, the source potential Vs is increased in accordance with the mobility of the drive transistor TrD. That is, when the mobility of the transistor TrD is high, the increased amount of the source potential Vs is high, and when the mobility is low, the increased amount of the source potential Vs is low. As a result, this will be the operation of adjusting the voltage Vgs between the gate and the source of the drive transistor TrD in the light emitting period in accordance with the mobility.

After that, when the source potential Vs is in the potential exceeding the threshold of the organic EL element 1, the organic EL element 1 is allowed to emit light.

In short, the drive transistor TrD allows drive current to flow in accordance with the potential stored in the storage capacitor Cs to thereby cause the organic EL element 1 to emit light. At this time, the source potential Vs of the drive transistor TrD is held in a given operation point.

The drive potential V1 is applied to the drain of the drive transistor TrD from the power control line DSL so that the drive transistor TrD is constantly operated in a saturated region, and therefore, the drive transistor TrD functions as a constant current source, and the electric current Ids represented in the above Formula 1, namely, the electric current corresponding to the voltage Vgs between the gate and the source of the drive transistor TrD flows in the organic EL element 1. According to this, the organic EL element 1 emits light at luminance corresponding to the signal value Vsig.

In the above operation of the embodiment, the Vth cancel operation is performed in the time division manner in periods t2, t4 and t6. In after-correction periods t3 and t5, the drive transistor TrD is completely cut off, thereby preventing the increase of the source potential Vs and the gate potential Vg.

As a method for cutting off the drive transistor TrD, the power pulse DS from the power control line DSL is made to be the intermediate potential V2 in the after-correction periods t3 and t5.

Figure 7:
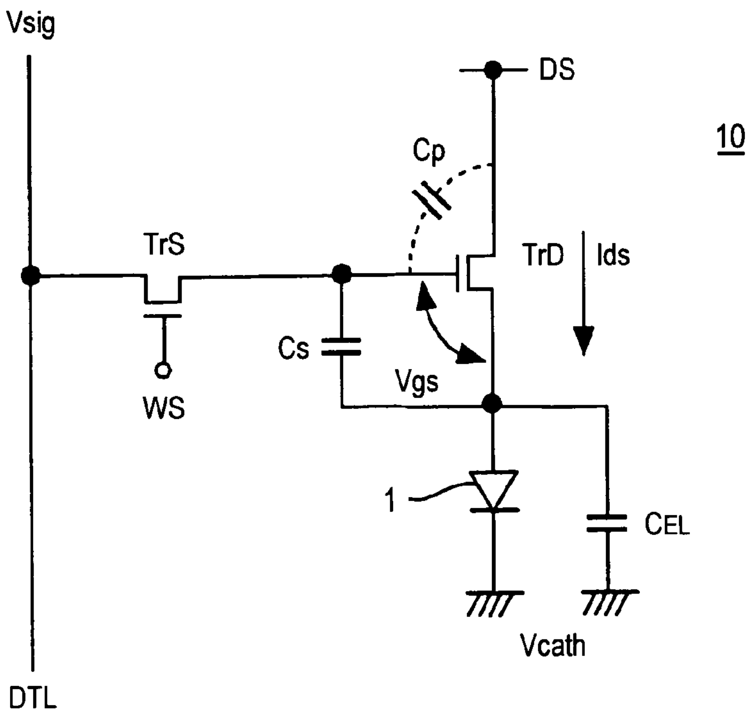
FIG. 7 is an equivalent circuit diagram in the circuit operation according the embodiment.

The power pulse is made to be the intermediate potential V2 to thereby form a coupling through a parasitic capacitor Cp between the gate and drain of the drive transistor TrD shown in FIG. 7.

Accordingly, the voltage between the gate and the source of the drive transistor TrD is reduced and cut of the drive transistor TrD to be in the state in which the electric current Ids does not flow.

As described above, the drive transistor TrD is cut off in the after-correction periods t3 and t5 to prevent the increase of the source potential Vs and the gate potential Vg as shown in FIG. 6.

Concerning the power pulse DS, the transition from the drive potential V1 to the intermediate potential V2 can be realized at high speed. As described above, in the case of the DTL input signal which is the signal supply system of the signal potential Vsig, several μ seconds are necessary for cutting off the drive transistor TrD due to load capacitance, characteristics of the signal line driver, on-resistance of the sampling transistor TrS and the like as described in FIG. 5. However, in the case of the power pulse DS, it is possible to perform transition from the drive potential V1 to the intermediate potential V2 rapidly because the degree of freedom in design of a pulse supply system such as the transistor size of the driver, and further, the power pulse DS is not affected by the resistance component because of operation of a capacitance system by the coupling. Accordingly, it is possible to cut off the drive transistor TrD, for example, for a period of 500 nsec or less in the embodiment.

Consequently, there are advantages in that the increase of the source potential Vs and the gate potential Vg in the after-correction periods t3 and t5 can be suppressed to realize the accurate Vth cancel operation while the higher frame rate is promoted and the request for further higher frequency of the circuit operation can be handled.

In order to normally perform the operation of the embodiment, the power pulse DS is reduced to the intermediate potential V2 after the scanning pulse WS is made to be L-level to turn off the sampling transistor TrS as shown in start timings and end timings of the after-correction periods t3 and t5. Before starting the scanning pulse WS again, the power pulse DS is increased to be the drive potential V1.

It is necessary that the intermediate potential V2 is higher than a value (Vofs−Vth) in which the drive transistor TrD is not turned on. When the intermediate potential V2 is less than the value (Vofs−Vth), the gate potential Vg is reduced when the Vth cancel operation in the time division manner is performed and there is a case in which the threshold voltage Vth is not held when the scanning pulse WS is started again.

Additionally, in order to increase a negative coupling value, it is desirable to apply a value as large as possible as the maximum power-pulse voltage value within the withstand voltage.

The embodiment of the invention has been explained as the above, however, the invention is not limited to the embodiment and various modifications can be considered.

For example, the configuration example including two transistors TrD, TrS and the storage capacitor Cs as the pixel circuit 10 as shown in FIG. 2 is cited in the embodiment, however, the invention can be applied to pixel circuits other than the above, for example, a case of the pixel circuit having a configuration including three or more transistors.

The present application contains subject matter related to that disclosed in Japanese Priority Patent Application JP 2008-210507 filed in the Japan Patent Office on Aug. 19, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel array including pixel circuits arranged in a matrix state, in which a given one of the pixel circuits has at least:

a light emitting element, a drive transistor configured to supply electric current to the light emitting element by a drive voltage supplied to the drive transistor, and a storage capacitor connected between a gate of the drive transistor and a source of the drive transistor, wherein a magnitude of the electric current depends on a voltage stored in the storage capacitor;

threshold correction means for performing a threshold correction operation in a time-divided manner across a plurality of threshold correction periods, the plurality of threshold correction periods occurring within one frame period, the threshold correction operation comprising supplying a drive voltage to the drive transistor while the potential of the gate of the drive transistor is at a reference potential such that, upon completion of performance of the threshold correction operation across the plurality of threshold correction periods, the threshold voltage of the drive transistor is stored in the storage capacitor; and cut-off control means for placing the drive transistor in a non-conducting state in an after-correction period, which is a period between two successive threshold correction periods of the plurality of threshold correction periods.

2. The display device of claim 1, wherein the cut-off control means places the drive transistor in a non-conducting state in the after correction period by supplying an intermediate voltage, which is lower than the drive voltage, to the drive transistor.

3. The display device of claim 2, wherein the intermediate voltage is higher than an initialization voltage, the initialization voltage being a voltage supplied to the drive transistor to stop the light emitting element from emitting light.

4. The display device of claim 2, wherein the threshold correction means and the cut-off control means comprise:

a signal selector that supplies a video signal to a signal line connected to the given one of the pixel circuits, the video signal alternating between at least the reference potential and a signal potential corresponding to luminance information;

a write scanner that controls the introduction of the video signal to the given one of the pixel circuits by driving a write control line; and a drive control scanner that supplies the drive voltage to the drive transistor through a power control line, wherein, in the plurality of threshold correction periods, the signal selector supplies the reference potential as the video signal while the write scanner drives the write control line to introduce the video signal to the given one of the pixel circuits, and wherein the intermediate voltage is supplied to the drive transistor by the drive control scanner.

5. The display device according to claim 4, wherein the given one of the pixel circuits further includes a sampling transistor, wherein a gate of the sampling transistor is connected to the write control line, a first current electrode of the sampling transistor is connected to the signal line, and a second current electrode is connected to the gate of the drive transistor, wherein one of the source and a drain of the drive transistor is connected to the light emitting element and a different one of the source and the drain of the drive transistor is connected to the power control line, wherein, in the threshold correction operation, the write scanner causes the sampling transistor to be conductive at a time when the reference potential as the video signal is supplied to the gate of the driving transistor through the sampling transistor, and wherein in the after-correction period the write scanner causes the sampling transistor to be non-conductive at a time when the intermediate voltage is supplied to the drive transistor.

6. The display device of claim 4, wherein the intermediate voltage is higher than an initialization voltage, the initialization voltage being a voltage supplied to the drive transistor by the drive control scanner to stop the light emitting element from emitting light.

7. The display device of claim 6, wherein the intermediate voltage and the initialization voltage are supplied to the drive transistor through the power control line.

8. The display device of claim 6, wherein the intermediate voltage is higher than a value obtained by subtracting the threshold voltage of the drive transistor from the reference potential.

9. The display device of claim 1, wherein the threshold correction means and the cut-off control means comprise:

a signal selector that supplies a video signal to a signal line connected to the given one of the pixel circuits, the video signal alternating between at least the reference potential, a signal potential corresponding to luminance information, and a cut-off potential lower than the reference potential;

a write scanner that controls the introduction of the video signal to the given one of the pixel circuits by driving a write control line; and a drive control scanner that supplies the drive voltage to the drive transistor through a power control line, wherein, in the plurality of threshold correction periods, the signal selector supplies the reference potential as the video signal while the write scanner drives the write control line to introduce the video signal to the given one of the pixel circuits, and wherein the cut-off control means places the drive transistor in a non-conducting state in the after correction period by supplying the cut-off potential as the video signal through the signal line to the gate of the drive transistor.

10. A method of driving a display device including a pixel array having pixel circuits arranged in a matrix state, in which a given one of the pixel circuits has at least a light emitting element, a drive transistor configured to supply electric current to the light emitting element by a drive voltage supplied to the drive transistor, and a storage capacitor connected between a gate of the drive transistor and a source of the drive transistor, wherein a magnitude of the electric current depends on a voltage stored in the storage capacitor, the method comprising:

performing a threshold correction operation in a time-divided manner across a plurality of threshold correction periods, the plurality of threshold correction periods occurring within one frame period, the threshold correction operation comprising supplying a drive voltage to the drive transistor while the potential of the gate of the drive transistor is at a reference potential such that, upon completion of performance of the threshold correction operation across the plurality of threshold correction periods, the threshold voltage of the drive transistor is stored in the storage capacitor; and placing the drive transistor in a non-conducting state in an after-correction period, which is a period between two successive threshold correction periods of the plurality of threshold correction periods.

11. The method of driving a display device of claim 10, wherein the drive transistor is placed in a non-conducting state in an after-correction period by supplying an intermediate voltage, which is lower than the drive voltage, to the drive transistor.

12. The method of driving a display device of claim 10, wherein the drive transistor is placed in a non-conducting state in an after-correction period by supplying a cut-off potential lower than the reference potential to the gate of the drive transistor.

13. A display device comprising:

a pixel array including pixel circuits arranged in a matrix state, in which a given one of the pixel circuits has at least:

a light emitting element, a drive transistor configured to supply electric current to the light emitting element by a drive voltage supplied to the drive transistor, and a storage capacitor connected between a gate of the drive transistor and a source of the drive transistor, wherein a magnitude of the electric current depends on a voltage stored in the storage capacitor;

a control circuit configured to:

perform a threshold correction operation in a time-divided manner across a plurality of threshold correction periods, the plurality of threshold correction periods occurring within one frame period, the threshold correction operation comprising supplying a drive voltage to the drive transistor while the potential of the gate of the drive transistor is at a reference potential such that, upon completion of performance of the threshold correction operation across the plurality of threshold correction periods, the threshold voltage of the drive transistor is stored in the storage capacitor; and place the drive transistor in a non-conducting state in an after-correction period, which is a period between two successive threshold correction periods of the plurality of threshold correction periods.

14. The display device of claim 13, wherein the drive transistor is placed in a non-conducting state in an after-correction period by supplying an intermediate voltage, which is lower than the drive voltage, to the drive transistor.

15. The display device of claim 13, wherein the drive transistor is placed in a non-conducting state in an after-correction period by supplying a cut-off potential lower than the reference potential to the gate of the drive transistor.

* * * * *